United States Patent [19]

Pearce

[11] 4,435,319

[45] Mar. 6, 1984

[54] PREPARATION OF PROTEIN ISOLATE FROM SUNFLOWER SEED

[75] Inventor: Robert J. Pearce, Beaumaris, Australia

[73] Assignee: Commonwealth Scientific and Industrial Research Organization, Campbell, Australia

[21] Appl. No.: 514,341

[22] Filed: Jul. 15, 1983

[30] Foreign Application Priority Data

Jul. 15, 1982 [AU] Australia .............................. PF4882

[51] Int. Cl.$^3$ ................................................ A23J 1/14
[52] U.S. Cl. .................................. 260/123.5; 426/656
[58] Field of Search ...................................... 260/123.5

[56] References Cited

U.S. PATENT DOCUMENTS

| | | | |
|---|---|---|---|
| 3,586,662 | 6/1971 | O'Connor | 260/123.5 |
| 3,622,556 | 11/1971 | O'Connor | 260/123.5 |
| 3,966,971 | 6/1976 | Morehouse et al. | 260/123.5 X |
| 4,212,799 | 7/1980 | Nuzzolo et al. | 260/123.5 |

OTHER PUBLICATIONS

J. of American Oil Chemists Society, 56, 438–442 (1979), Sosulski.

Cereal Chemistry, 25, 399–406 (1948), Smith et al.
Journal of Food Science, 35, 453–456 (1970), Gheyasuddin et al.

Primary Examiner—Howard E. Schain
Attorney, Agent, or Firm—Sughrue, Mion, Zinn, Macpeak, and Seas

[57] ABSTRACT

A process for extracting protein from sunflower seed meal, which protein is free from dark or unacceptable colors. The process involves the sequential steps of (1) treating a suspension of sunflower seed meal with an acid at a pH of between 4.0 and 7.0; (2) separating the insoluble residue from the protein extract; (3) resuspending the insoluble residue and repeating steps (1) and (2) sequentially on the residue until the desired depletion of color has been achieved; (4) resuspending and treating the insoluble residue with an acid other than sulphuric acid at a pH<4.0; (5) separating the insoluble residue from the protein extract; (6) repeating steps (4) and (5) until the desired amount of protein has been extracted; and (7) combining the protein extract from steps (2), (3), (5) and (6) and recovering the protein therefrom by either precipitation with an acid or by ultrafiltration. The protein is of a quality making it suitable as a supplement in human nutrition.

9 Claims, No Drawings

PREPARATION OF PROTEIN ISOLATE FROM SUNFLOWER SEED

This invention relates to sunflower seed protein and to a method for its extraction. The term "protein" used herein is intended to cover any protein or mixture of proteins present in sunflower seeds.

Sunflower seed has been shown to have a high content of useful protein and no antinutritive factor (Sosulski, F. J., Journal of American Oil Chemists Society, 56, 438 (1979)). The digestability of sunflower protein and its high biological value, make it superior to most proteins with a considerable potential for use as a protein supplement in human nutrition.

Sunflower meal is the residue resulting from the extraction of oil from sunflower seed and is a readily available source from which sunflower protein may be extracted. To date, the commercial extraction of sunflower protein for human nutrition has not been undertaken primarily due to the fact that a green to black colouration develops during alkaline extraction, making the product unacceptable as described by Smith, A. K. and Johnson, V. in Cereal Chemistry, 25, 399–406 (1948). This report indicated that the green colour can be temporarily removed from the protein isolate by the use of reducing agents such as dithionite salts during alkaline extraction. The protein recovered after use of this reducing agent may be light coloured but the green colour appears if this protein isolate is utilized as a supplement in foods with even a slightly basic pH. Obtaining a colourless or near colourless protein isolate has been recognized as the most difficult and most important problem to be overcome before this valuable protein source can be fully utilized. Subsequently several reports and patents have been published claiming processes capable of producing light coloured or colourless isolates. Gheyasuddin, S., Carter, C. M. and Mattil, K. F. reported in the Journal of Food Science 35, 453 (1970) that alkaline extraction of sunflower seed meal in the presence of sulphite or meta-bisulphite resulted in near colourless sunflower protein isolate. Patents in the name of David E. O'Connor (U.S. Pat. Nos. 3,586,662 (1971) and 3,622,556 (1971)) describe processes for preparing light coloured protein isolate from sunflower meal by acid washing prior to alkaline extraction and by alkali extraction under an inert gas blanket followed by membrane filtration. Nuzzola, C., Vignola, R. and Groggia, A. in U.S. Pat. No. 4,212,799 (1980) describe a process for producing a near colourless sunflower protein isolate by alkaline extraction in the presence of aluminium sulphate followed by acid precipitation with citric acid to recover and protein and remove coloured components. None of the processes described above have proved satisfactory.

We have now found a process for the production of protein isolates from sunflower seed meal, which are free from dark or unacceptable colours.

The present invention is based on the following discoveries:

1. Sunflower protein may be rendered substantially soluble at low pH.
2. Extraction of protein at high pH ($>7.0$) promotes autoxidation of polyphenols (present in a high level) to darker less soluble products.
3. Dark or unacceptable colours are also produced as a result of complexing metal ions (particularly iron, copper and aluminium) with polyphenols such as chlorogenic acid.
4. Metal ion—polyphenol complexes cannot exist below pH 2.5.
5. The extractability of proteins at low pH is poor, unless the meal is pretreated at a higher pH.
6. The solubility of protein at low pH may remain low at low pH even after the appropriate pretreatment if the wrong acidulant is utilized to achieve the low pH.
7. The solubility of protein at low pH may remain low at low pH even after the appropriate pretreatment if the salt concentration is not correct.

According to the present invention there is provided a process for the production of a protein isolate from sunflower seed meal, which process comprises the sequential steps of:

(1) treating a suspension of sunflower seed meal with an acid at a pH of between 4.0 and 7.0;
(2) separating the insoluble residue from the protein extract;
(3) resuspending the insoluble residue and repeating steps (1) and (2) sequentially on the residue until the desired depletion of colour has been achieved;
(4) resuspending and treating the insoluble residue with an acid other than sulphuric acid at a pH $<4.0$;
(5) separating the insoluble residue from the protein extract;
(6) repeating steps (4) and (5) until the desired amount of protein has been extracted;
(7) combining the protein extract from steps (2), (3), (5) and (6) and recovering the protein therefrom by either precipitation with an acid or by ultrafiltration.

Preferably, the sunflower seed meal used in the process is of good quality and is finely ground prior to suspension. The suspending medium is generally pure water with deionized water being preferred. In order to promote extraction, the suspension may be agitated for a period of time sufficient to produce the desired extract.

The protein may be recovered in step (7) by adjusting the pH of the extract to a value in the range of 4.0 to 6.0 to obtain a protein precipitate. The precipitate is separated from the supernatant and may be washed in an appropriate manner with good quality, preferably deionised, water, which may be slightly acidified to a pH between 4.0 and 6.0. The protein precipitate so obtained is the sunflower protein isolate which is dried in an appropriate manner.

Alternatively, the protein in step (7) may be recovered by ultrafiltration of the extract over a semi-permeable membrane until the nitrogenous matter content in the retentate is in the range of 3–30%. A volume of good quality, preferably deionised water, preferably adjusted to a pH equal to that of the retentate is added to the retentate while the ultrafiltration process continues to achieve removal of residual, permeable components in the extract. The retentate so washed is concentrated further by the ultrafiltration process until the nitrogeneous matter contributes $>80\%$ by weight of the total dry matter. The final retentate may be isolated directly by freeze drying or spray drying. Alternatively, the pH of the retentate may be adjusted between 4.0 and 6.0 to achieve precipitation of the protein. This suspension may then be dried directly by freeze drying or spray drying. It may be appropriate to more finely divide the particulate matter in the suspension by treatment in a colloid mill, prior to the drying process.

The temperature at which the pretreatment and extraction processes are performed is not critical, but extraction of the soluble components is more thorough when these operations are performed below 50° C. The acid used to acidify the extractant in the pretreatment process at pH 4.0 to 7.0 is not critical. Hydrochloric, nitric and sulphuric acids are equally effective. Hydrochloric acid is used preferably. The acid used to acidify the extractant for the protein extraction process at pH <4.0 may be hydrochloric or nitric acids, etc., but not sulphuric acid. pH adjustment should be performed carefully since over adjustment followed by partial neutralisation results in an increased concentration of salts, which is detrimental to the yield of protein obtainable.

Embodiments of the invention will now be described with reference to the following Examples in which all the steps were performed at ambient temperature, all the water used was deionised, all the contact surfaces were stainless steel and all the reagents used were analytical or food grade.

EXAMPLE 1

30 kg of commercial defatted sunflower meal, ground to a mesh size of <1.5 mm, was suspended in 250 liters of water adjusted to pH 5.0 and maintained at that pH with 18% w/v hydrochloric acid and agitated for 30 minutes. The insoluble residue was separated from the aqueous extract and reextracted at pH 5.0 with a further 300 liters of water. The insoluble residue was again separated from the aqueous extract and resuspended in 150 liters of water. The pH was adjusted to 2.0 with 18% hydrochloric acid and maintained during agitation for 30 minutes. The insoluble residue was separated from the aqueous extract and reextracted in a further 300 liters of water at pH 2.0 for 30 minutes. The extracts at pH 2.0 were combined and the pH adjusted to 5.0 with 30% w/v sodium hydroxide solution. The precipitate obtained was separated from the supernatant liquor by centrifugation. After resuspension in a volume of deionised water to yield approximately 10% total solids by weight and treatment in a colloid mill to ensure a fine particle size, the suspension was spray dried.

EXAMPLE 2

In this example 30 kg of sunflower meal was treated by the procedure described in Example 1, but the combined extracts at pH 2.0 were treated as follows. The combined extract at pH 2.0, totalling 450 liters, was ultrafiltered over a semi permeable membrane having a nominal molecular weight retention of 20,000 daltons at a temperature of 40°–45° C. and at an inlet pressure of 400 kPa. Ultrafiltration was performed until the volume was reduced to about 45 liters. An equal volume of water, acidified to pH 2.0 with hydrochloric acid, was added and ultrafiltration continued until the volume was again reduced to 45 liters. This latter process of dilution and reconcentration was repeated four times after which the permeating liquor was near colourless when adjusted to pH 10.5 with sodium hydroxide solution. The retentate was concentrated to about 20 liters and then removed from the ultrafiltration plant. The pH of the retentate was adjusted to 5.0 with 12% sodium hydroxide solution and the resulting suspension was spray dried directly.

EXAMPLE 3

In this example sunflower meal is extracted in a continuous process rather than the batch process described in Examples 1 and 2. For this purpose a counter-current extractor is used (Australian Patent No. PE 2383/80). 30 kg of commercial defatted sunflower meal ground to a mesh size of <1.5 mm is added to 66 liters of deionised water and adjusted to pH 5.0 by the addition of approximately 1200 ml 16% w/v hydrochloric acid. This yields a consistency which is totally wetted but without surplus liquid. The pH 5.0 soluble components are extracted from the meal by the counter flow of deionised water adjusted to pH 5. The counter-current extractor is operated to result in a total extraction time of 90 minutes and a total extractant to dry meal ratio of approximately 4:1. The wet, extracted residue is pressed to remove excess extractant. To the resulting moist residue (40 kg), 24 liters of water are added together with 3200 ml 16% w/v hydrochloric acid which results in a pH of approximately 2 and a fully wetted consistency. The protein is extracted from the meal by the counter flow of deionised water adjusted to pH 2.0 with hydrochloric acid in the counter-current extractor operating as in the pH 5.0 extraction step of the process. The protein extract was clarified and the protein recovered by isoelectric precipitation or ultrafiltration as described in Examples 1 and 2.

RESULTS

TABLE 1

The effect of pretreatment at pH 5.0 on the extractability of sunflower protein at pH 2.5 in hydrochloric acid and 0.05 MNaCl.

| Sample | Yield (% of protein) $N \times 6.25$ |
|---|---|
| no pretreatment at pH 5.0 | 7.3 |
| pretreatment once at pH 5.0 | 11.0 |
| pretreatment twice at pH 5.0 | 28.8 |

TABLE 2

The removal of nitrogenous extractibles in successive pH 5.0 treatments in hydrochloric acid at different temperatures.

| Sample no. of pretreatments at pH 5.0 | Protein equivalent extracted ($N \times 6.25$) in pH 5.0 extract | | |
|---|---|---|---|
| | 30° C. | 40° C. | 50° C. |
| 1 | 7.9 | 6.0 | 4.8 |
| 2 | 1.7 | 1.4 | 1.2 |
| 3 | 0.6 | 0.3 | 1.7 |
| Total | 10.2 | 7.7 | 7.7 |

TABLE 3

The effect of acid type on extractability of sunflower protein at pH 2.5.

| Acid Type | pH of extraction | Yield % | Total yield % |
|---|---|---|---|
| Hydrochloric | 5.0 (2 pretreatments) | 6.7 | |
| | 2.5 (1st extract) | 26.8 | 33.4 |
| | 2.5 (2nd extract) | 6.6 | |
| Nitric | 5.0 (2 pretreatments) | 10.21 | |
| | 2.5 (1st extract) | 21.5 | |

TABLE 3-continued
The effect of acid type on extractability of sunflower protein at pH 2.5.

| Acid Type | pH of extraction | Yield % | Total yield % |
|---|---|---|---|
| Sulphuric | 2.5 (2nd extract) | 4.5 | 26.0 |
|  | 5.0 (2 pretreatments) | 6.8 |  |
|  | 2.5 (1st extract) | 3.7 | 4.6 |
|  | 2.5 (2nd extract) | 0.9 |  |

TABLE 4
The effect of hydrochloric and sulphuric acids in pretreatment and protein extraction at pH 2.5.

| Acid type in pretreatment at pH 5.0 | Acid type in pretreatment at pH 2.5 | Yield % |
|---|---|---|
| sulphuric | sulphuric | 4.2 |
| sulphuric | hydrochloric | 31.4 |
| hydrochloric | sulphuric | 4.4 |
| hydrochloric | hydrochloric | 33.4 |

TABLE 5
The effect of pH in the range (3.0–2.0) on the extractability of sunflower protein with dilute hydrochloric acid after two pretreatments at pH 5.0 in hydrochloric acid.

| pH of extraction | Yield % | | Total Yield % |
|---|---|---|---|
| 3.0 | 1st extract | 11.1 | 13.8 |
|  | 2nd extract | 2.7 |  |
| 2.5 | 1st extract | 21.4 | 27.1 |
|  | 2nd extract | 5.7 |  |
| 2.0 | 1st extract | 28.1 | 36.1 |
|  | 2nd extract | 8.0 |  |

TABLE 6
The effect of pH in the range (2.5–1.5) on the extractability of sunflower protein with dilute hydrochloric acid after two pretreatments at pH 5.0 in hydrochloric acid.

| pH of extraction | Yield % | | Total Yield % |
|---|---|---|---|
| 2.5 | 1st extract | 24.1 | 29.9 |
|  | 2nd extract | 5.8 |  |
| 2.0 | 1st extract | 31.6 | 39.4 |
|  | 2nd extract | 7.8 |  |
| 1.5 | 1st extract | 34.9 | 44.0 |
|  | 2nd extract | 9.1 |  |

TABLE 7
The effect of temperature on the extractability of sunflower protein at pH 2.0 in hydrochloric acid after two pretreatments at pH 5.0 in hydrochloric acid.

| Temperature of extraction and pretreatment °C. | Yield % | | Total Yield % |
|---|---|---|---|
| 30 | 1st extract | 29.7 | 37.1 |
|  | 2nd extract | 7.5 |  |
| 40 | 1st extract | 29.4 | 36.5 |
|  | 2nd extract | 7.1 |  |
| 50 | 1st extract | 22.7 | 27.1 |
|  | 2nd extract | 4.4 |  |

TABLE 8
The effect of concentration of sodium chloride on the extractability of sunflower protein at pH 2.0 in hydrochloric acid at 20° C. after two pretreatments at pH 5.0 in hydrochloric acid.

| Sodium chloride concentration (M) | Yield % | | Total Yield % |
|---|---|---|---|
| 0 | 1st extract | 31.6 | 39.4 |
|  | 2nd extract | 7.8 |  |
| 0.05 | 1st extract | 27.7 | 35.2 |
|  | 2nd extract | 7.5 |  |
| 0.10 | 1st extract | 19.6 | 25.0 |
|  | 2nd extract | 5.4 |  |
| 0.50 | 1st extract | 5.3 | 7.2 |
|  | 2nd extract | 1.9 |  |

I claim:

1. A process for the production of a protein isolate from sunflower seed meal, which process comprises the sequential steps of:
   (1) treating a suspension of sunflower seed meal with an acid at a pH of between 4.0 and 7.0;
   (2) separating the insoluble residue from the protein extract;
   (3) resuspending the insoluble residue and repeating steps (1) and (2) sequentially on the residue until the desired depletion of colour has been achieved;
   (4) resuspending and treating the insoluble residue with an acid other than sulphuric acid at a pH <4.0;
   (5) separating the insoluble residue from the protein extract;
   (6) repeating steps (4) and (5) until the desired amount of protein has been extracted;
   (7) combining the protein extract from steps (2), (3), (5) and (6) and recovering the protein therefrom by either precipitation with an acid or by ultrafiltration.

2. A process as claimed in claim 1, wherein the acid used in step (1) is an inorganic acid selected from the group consisting of hydrochloric, nitric and sulphuric acids.

3. A process as claimed in claim 2, wherein the acid used in step (1) is hydrochloric acid.

4. A process as claimed in any one of the preceding claims, wherein the acid used in step (4) is hydrochloric or nitric acid.

5. A process as claimed in claim 4, wherein the acid used in step (4) is hydrochloric acid.

6. A process as claimed in claim 1 or claim 2, wherein the sunflower seed meal is finely ground prior to treatment, and suspended in pure water.

7. A process as claimed in any one of claims 1 to 3, wherein the suspension of sunflower seed meal and/or the suspension of insoluble residue is agitated with the acid.

8. A process as claimed in any one of claims 1 to 3, which is carried out within the temperature range of 20° to 50° C.

9. A protein isolate prepared according to any one of claims 1, 2 or 3.